(12) United States Patent
Freudenberg et al.

(10) Patent No.: US 7,318,582 B2
(45) Date of Patent: Jan. 15, 2008

(54) ASSEMBLY BEARING WITH HYDRAULIC DAMPING

(75) Inventors: Tillmann Freudenberg, Birkenau (DE); Erhard Moog, Birkenau (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 10/506,589

(22) PCT Filed: Mar. 26, 2003

(86) PCT No.: PCT/EP03/03123

§ 371 (c)(1),
(2), (4) Date: Jun. 10, 2005

(87) PCT Pub. No.: WO03/081079

PCT Pub. Date: Oct. 2, 2003

(65) Prior Publication Data

US 2005/0236750 A1    Oct. 27, 2005

(30) Foreign Application Priority Data

Mar. 26, 2002    (DE) ............................... 102 13 750

(51) Int. Cl.
F16F 5/00    (2006.01)

(52) U.S. Cl. ................................. 267/140.14

(58) Field of Classification Search .............
267/140.11–140.15
See application file for complete search history.

(56) References Cited

U.S. PATENT DOCUMENTS 4,836,515 A    6/1989    Franz et al.
4,877,225 A    10/1989   Noguchi et al.

FOREIGN PATENT DOCUMENTS

DE    39 33 252 A1    4/1991
DE    196 20 219 A1   11/1996
DE    101 21 399 A1   11/2002
EP    0 297 174 A2    11/1987
EP    0 852 304 A1    12/1997

*Primary Examiner*—Xuan Lan Nguyen
(74) *Attorney, Agent, or Firm*—Harness, Dickey & Pierce, P.L.C.

(57) ABSTRACT

The invention relates to an assembly bearing with hydraulic damping, especially for supporting engines and/or gearboxes in motor vehicles. Said bearing comprises a working chamber (10) and a compensation chamber (20) which respectively have partially elastically deformable walls (30, 40) and are separated by a dividing wall (50), but interconnected by means of a damping channel (60) through which a fluid is guided, in addition to another passage opening (14) which can be variably adjusted from outside. According to the invention, a decoupling device for insulating high-frequency, low-amplitude vibrations is provided in the dividing wall (50), the other passage opening (14) being arranged upstream or downstream of said decoupling device.

14 Claims, 7 Drawing Sheets

ASSEMBLY BEARING WITH HYDRAULIC DAMPING

CROSS-REFERENCE TO RELATED APPLICATIONS

This application is a National Stage of International Application No. PCT/EP03/03123, filed Mar. 26, 2003. This application claims the benefit of German patent application 102 13 750.1, filed Mar. 26, 2002. The disclosures of the above applications are incorporated herein by reference.

FIELD OF THE INVENTION

The invention relates to an assembly bearing with hydraulic damping, especially for supporting engines and/or gearboxes in motor vehicles.

BACKGROUND OF THE INVENTION

Hydraulically damped assembly bearings are generally known from, for example, DE 39 33 252 C2. In essence, the known assembly bearing is provided with a hydraulic chamber divided by a dividing wall into a working chamber and a compensation chamber. In the dividing wall is disposed a damping channel which interconnects the two chambers and permits a fluid to flow through.

The working chamber is limited at the top by a spring body that essentially has the shape of a truncated cone and is made of an elastic rubber material with a vulcanized connecting piece. The working chamber is limited at the bottom by a compensation membrane capable of taking up volume without pressure and which is covered by a bearing cap provided with fastening means. In addition, an overflow gap is provided in the compensation chamber, the opening cross-section of which can be variably adjusted from the outside.

The opening gap is formed by an axially displaceable, conical lowering plate in the compensation chamber, and is provided with breaches and a corresponding conical counter-surface which is fitted to an intermediate part. In this manner, a quenching effect variable in frequency is achieved, wherein the effect is intended to result in a frequency-dependent, regulatable acoustic abatement.

The known assembly bearing has a drawback, however, that because of the inertia of the liquid column in the damping channel compared to the higher-frequency and high-frequency low-amplitude excitation, these vibrations are not transmitted to the compensation chamber. As a result, the desired quenching does not take effect, or insufficiently takes effect.

SUMMARY OF THE INVENTION

The object of the invention is to further develop an assembly bearing so that it can decouple or dampen higher-frequency and high-frequency vibrations of small amplitudes such as those generated on a drive unit of vehicles with higher rotational speeds, and faster-traveling vehicles. In addition, it should be possible to provide an idle mode by simple additional fabrication measures.

According to an aspect of the invention, an assembly bearing with hydraulic damping for supporting engines and/or gearboxes in motor vehicles, is provided with a working chamber and a compensation chamber which respectively have partially elastically deformable walls, and are separated from one another by a dividing wall. The working chamber and compensation chamber, however, are interconnected by means of a damping channel through which a fluid is guided, and by an additional passage opening that can be variably adjusted from outside. The dividing wall comprises a decoupling device for isolating high-frequency, low-amplitude vibrations. According to the invention, the decoupling device is disposed either upstream or downstream of the additional passage opening.

The springing characteristics of the assembly bearing of the invention with hydraulic damping are determined by four main components: a bearing spring, an expanding spring, a quenching channel, and the decoupling device for acoustic vibrations. Thus, the assembly bearing of the invention has advantages such as, for example:

1. Vibration decoupling: The bearing spring is soft, and the decoupling action is very good in the entire frequency range;

2. Quenching of sputtering movement: In the case of very large amplitudes (spluttering movement of the assembly), the bearing must, at such a frequency, become very stiff. To this end, the expanding spring is operated in parallel with the bearing spring. In the case of hydraulic anti-vibration mountings, this occurs through the action of the fluid mass in the damping channel, wherein the mass is adjusted so that, like a quencher, it vibrates counter to the excitation; and 3. Decoupling of acoustics: The decoupling device comes into play at high frequencies (low amplitudes, structure-borne noise). The device absorbs the low-amplitude, high-frequency vibrations and isolates them from the undercarriage.

Moreover, as a result of the additional passage opening, the assembly bearing of the invention has an additional quenching function which can be flexibly adapted as well as actively controlled. In contrast to the known actively controllable hydraulic anti-vibration mountings, however, the assembly bearing of the invention is characterized by a substantially more simple construction and, thus, a lower fabrication cost.

In a preferred embodiment of the invention, the additional passage opening is located in the working chamber and is thus disposed upstream of the decoupling device. The advantage of this arrangement is that the inertia effect of the liquid is spatially directly coordinated with the resilience of the expanding spring which results in a better quenching action.

In another advantageous embodiment of the invention, the decoupling device comprises a membrane. Arrangements with a membrane are known per se. As a rule, a membrane is inserted into a membrane cage. The membrane is slack all around and particularly in the axial direction of the bearing. The slack is of a magnitude such that at a defined amplitude, often, for example, ±0.2 mm, the free path between the upper and the lower grating of the membrane cage is used up. If the amplitudes are less than ±0.2 mm, as in the case of the high-frequency, low-amplitude acoustic vibrations, the membrane ideally moves so that no pressure is generated in the chamber. As a result, no force is transmitted and there is no damping, either. The vibrations are isolated from the undercarriage. The present invention, however, is by no means limited to the described decoupling device. For example, the use of other known membranes is also conceivable.

It has been found advantageous during the operation of the bearing to set the passage opening variably as a function of at least one control input provided by the bearing, particularly by means of a control system provided for this purpose. A control input suitable in principle is the frequency of any harmonic excitation.

It has been found advantageous, however, to select as the control input the dominant shaft order, particularly for four-cylinder in-line engines, the second shaft order. In this manner, it is possible to reduce the vehicle hum which essentially is due to the dominant shaft order. In principle, however, other shaft orders that have a disturbing effect on vehicle acoustics can also be selected. Thus, it can occur, for example, that at fixed frequencies parts of the vehicle enter into resonance so that it can also be advantageous to set the quenching frequency of the arrangement to these frequencies.

In a preferred embodiment of the invention, the passage opening is formed by a peripherally extending conical surface and, in correspondence with this conical surface, a lowering plate with an adjustable height and disposed in the working chamber. This configuration requires only a minor fabrication expense. In this case, the outer edge of the lowering plate is advantageously bent away from the decoupling device thus forming the wall of a short channel.

The peripherally extending conical surface is advantageously fitted to a ring provided on the dividing wall. With such an arrangement the damping channel can be integrated into the dividing wall, which reduces the fabrication cost.

For simplicity, the lowering plate is borne by a shifting rod essentially disposed centrally in the bearing and capable of axial movement. The rod is guided though corresponding central openings from below and penetrates through the compensation chamber all the way into the working chamber. This, too, is a relatively simple construction measure with the aid of which the variable setting of the cross-section of the opening can be achieved more simply.

Advantageously, there is provided a device for the axial displacement of the shifting rod. This device can be, for example, an electric stepping motor.

When active control of the passage opening is intended, the electric motor is operated by means of a control system.

It is also advantageous to provide the lowering plate with an additional passage opening. By this measure, the damping in the low-frequency range is reduced, and the quenching effect is enhanced.

The present invention, however, is not limited to the described configuration. Other designs for realizing a variably adjustable passage opening are conceivable, for example the use of an iris diaphragm, rotary disk valve, blind or throttle valve.

In another advantageous embodiment of the invention, there is provided an idling mode. According to the invention, the idling mode is obtained during idling by reducing the passage opening to the smallest opening cross-section. Moreover, the decoupling device has a membrane with a free play which is limited during vehicle operation. The free play is released in the idling mode. In this position, the liquid column can vibrate against the expanding spring without being restricted by the free play. The quenching effect is adjusted to the idling speed. In this embodiment, the assembly bearing of the invention combines in itself all advantages of an idle bearing with those of an actively controllable engine bearing.

The idling mode can be realized simply by providing the shifting rod with an actuation element whereby, when the lowering plate is lowered to attain the smallest opening cross-section, the lower, membrane free play-limiting wall of the membrane cage is entrained downward, for example against the force of a spring. The spring is, for example, a disc spring.

When the lowering plate for reducing damping in the low-frequency range is provided with an additional passage opening, then, in the event of an impact, the lowering plate can, during idling, move against the conical surface and act as a stop without adversely affecting the dynamic stiffness. This simplifies the control of the adjusting motor for the lowering plate.

The assembly bearing of the invention provides very good decoupling in the selected, for example dominant, shaft order over the entire rotational speed range.

Moreover, as described hereinabove, with the assembly bearing of the invention, it is possible to achieve effective idling decoupling. Fabrication advantages arise from the fact that the design of the assembly bearing of the invention is very simple, that only low adjustment energy is needed and that no additional mounting space is needed. The assembly bearing of the invention is particularly well suited for all assemblies with pronounced dominant excitation, for example for four-cylinder in-line engines, especially Diesel engines.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
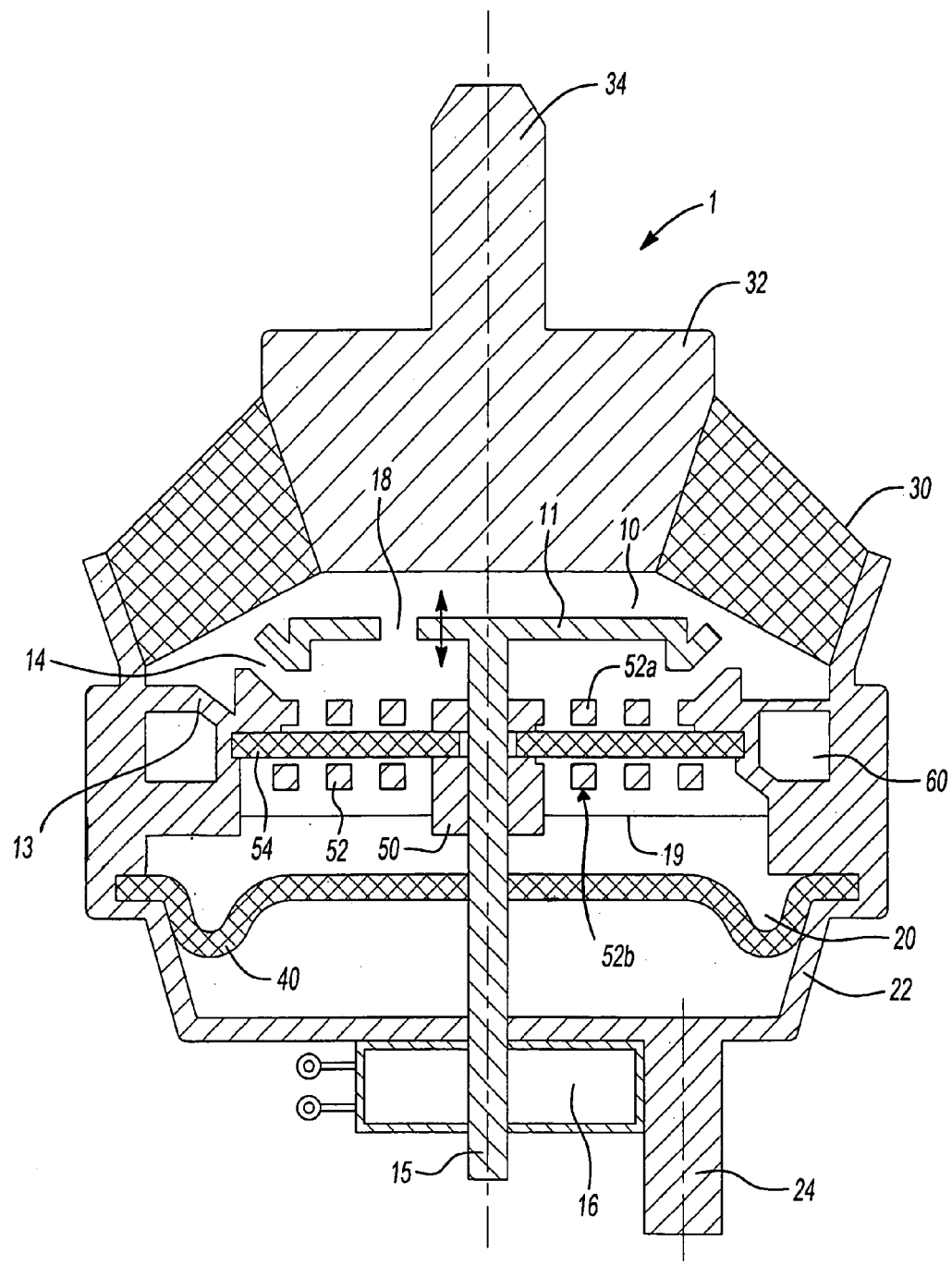
FIG. 1 is a schematic representation of a vertical section through an assembly bearing of the invention in a preferred embodiment.

FIG. 1 shows a vertical section through a hydraulically damped engine bearing 1 provided with a working chamber 10 and a compensation chamber 20 which is filled with a common hydraulic fluid. The working chamber 10 is limited by a wall 30 that is shaped as a truncated cone, made of an elastic material, and known as the bearing spring. The compensation chamber 20 is limited at the bottom by a cup-shaped wall 40, also made of an elastic material, for example of an air bellows capable of taking up volume without creating pressure. The peripheral wall 30 accommodates a bearing plate 32 which faces the engine and which is provided with a protruding screw bolt 34 for fastening to the engine. Between the working chamber 10 and compensation chamber 20 is disposed a dividing wall 50 in which is provided a membrane cage 52 that contains a membrane 54. In the dividing wall 50 is also provided a damping channel 60 that hydraulically interconnects the two liquid-filled chambers 10 and 20. The lower dividing wall 40 of the compensation chamber 20 is surrounded by a housing 22 on which is provided a vertically protruding screw bolt 24 for fixing the assembly bearing on the side of the vehicle body.

In the embodiment shown, the membrane cage 52 comprises an upper cover part 52a and a lower bottom part 52b. Membrane 54 is disposed in the membrane cage 52 so as to be movable in the axial direction. Membrane cage 52 is provided with bars disposed at a distance from one another, between which breaches are provided in the upper cover part 52a and the lower bottom part 52b. The breaches make it possible for the fluid to act on the membrane 54. Membrane 54 is made of an elastic material in a manner which in itself is known.

Moreover, one can see in working chamber 10 an additional passage opening 14 formed by the lowering plate 11 and a corresponding peripherally extending conical surface 13. Lowering plate 11 is borne by an axially movable shifting rod 15. In the embodiment shown, without limiting general applicability, the shifting rod 15 can be displaced in the axial direction between an opening and a closing position by means of an electric motor.

During idling, the passage opening 14 is closed, and the lowering plate 11 is in the lower, closing position. In this case, the surrounding conical surface 13 forms a stop for the edge of the lowering plate 11 that is bent away from a decoupling device 54. When the vehicle is in operation, the lowering plate is continuously displaced upward by means of motor 16 in accordance with a pre-specified frequency variation. In this manner, the cross-section of passage opening 14 is continuously increased. Passage opening 14 thus acts as an additional quencher, wherein the quenching point is controlled from outside in accordance with the specified frequency variation. This is reflected in a lowering of the dynamic stiffness of the bearing 1 which follows the relevant frequency. The drawing also shows an opening 18 in the lowering plate 11 which serves to reduce the damping in the low-frequency range.

Figure 2A:
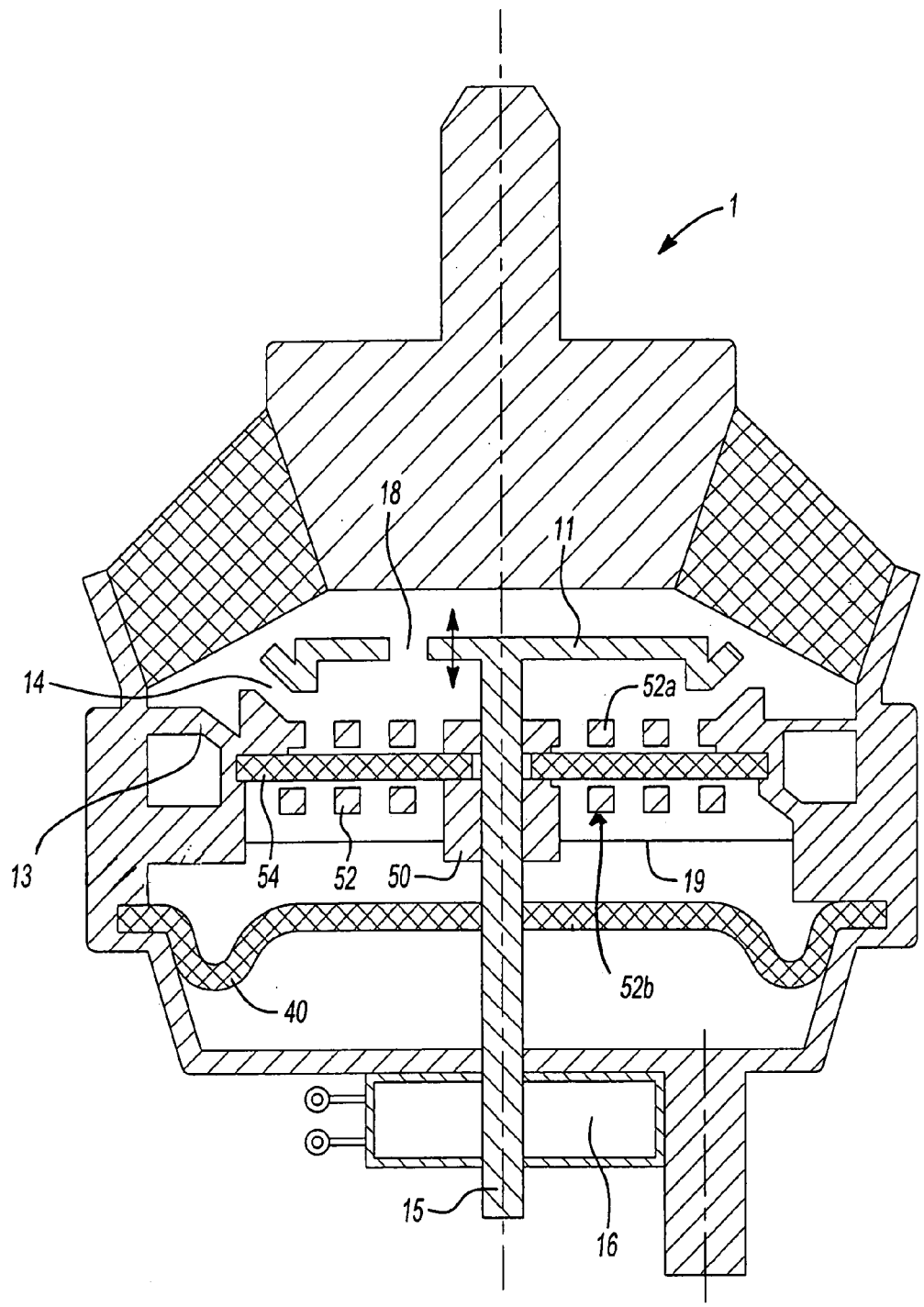
FIGS. 2 a,b show a vertical section through an assembly bearing of the invention in the idling mode.
Figure 2B:
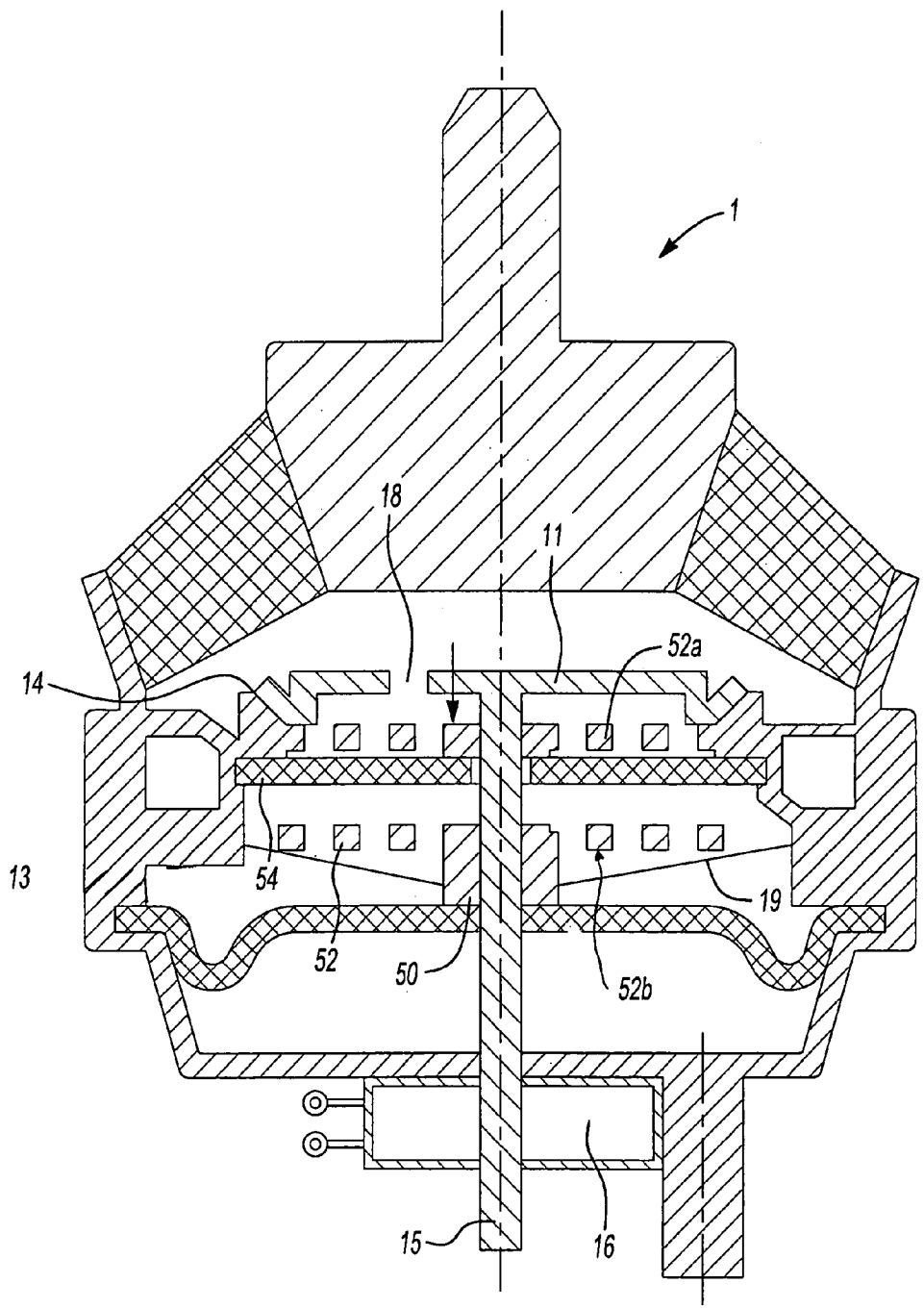

FIGS. 2a and 2b represent a diagrammatic sketch of the functioning of the idling mode for the assembly bearing 1 of FIG. 1. For greater clarity, the bearing components that are not relevant for the operation in the idling mode are not provided with reference numerals. FIG. 2a shows the assembly bearing 1 of the invention during vehicle operation with the passage opening 14 open.

FIG. 2b illustrates the functioning of the idling mode. It can be seen from FIG. 2b that the lower dividing wall 52b of the membrane cage 52 is connected with shifting rod 15 in a manner such that when the passage opening 14 is closed by a downward movement of shifting rod 15 and the lowering plate 11, the bottom of membrane cage 52 is also displaced downward. In the embodiment shown, this takes place against the force of a disc spring 19. Lowering plate 11 is displaced downward until its bent-out edge comes to rest on conical surface 13, namely when the passage opening 14 is closed. By the downward movement of the bottom 52b of the membrane cage 52, free play is released. Assembly bearing 1 is now in the idling mode.

Figure 3:
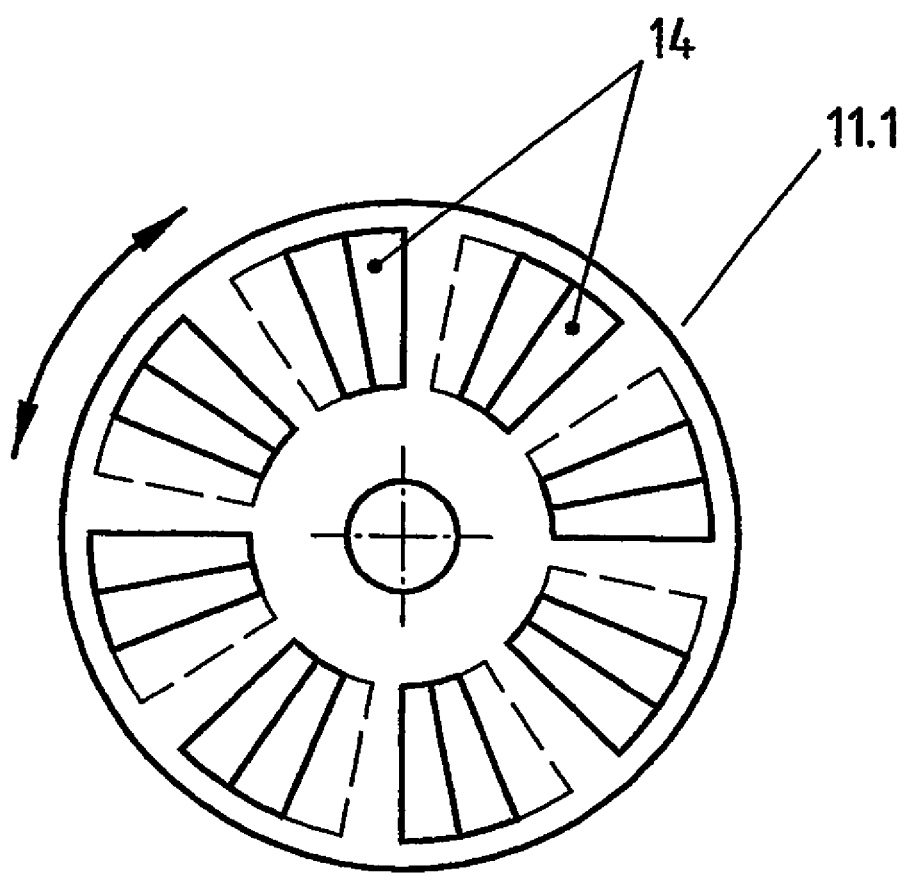
FIG. 3 is a schematic representation of a top view of a rotary disk valve for realizing the variably adjustable passage opening.
Figure 4:
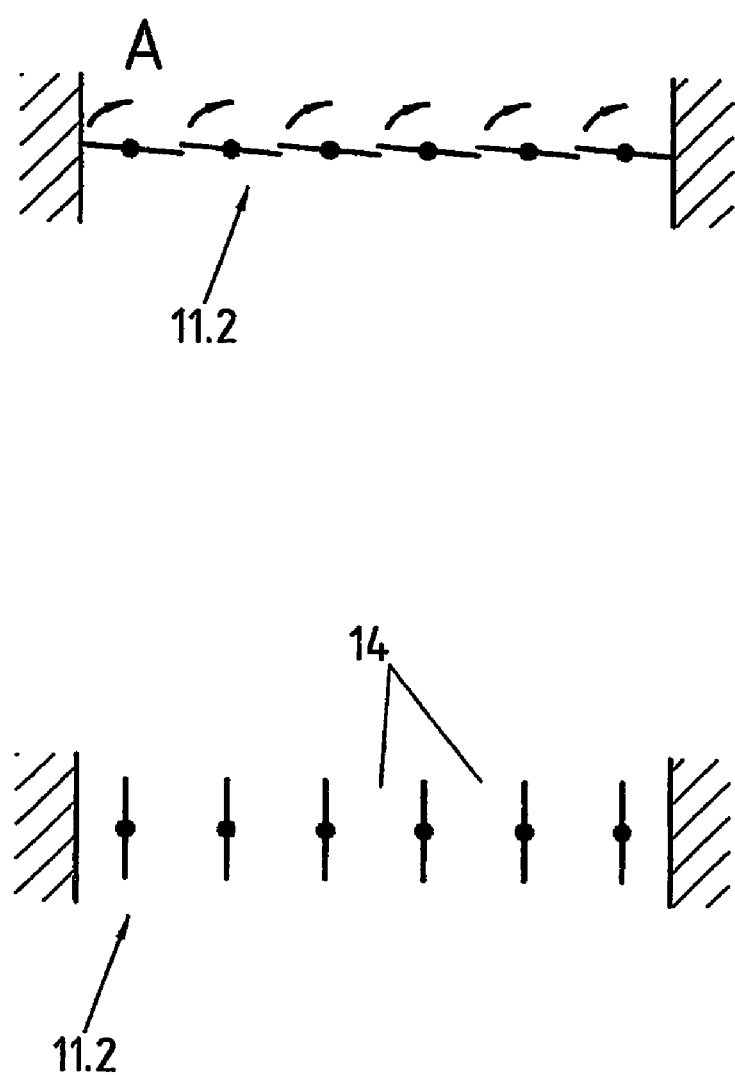
FIG. 4 is a schematic representation of a side view of a blind for realizing the variably adjustable passage opening.
Figure 5:
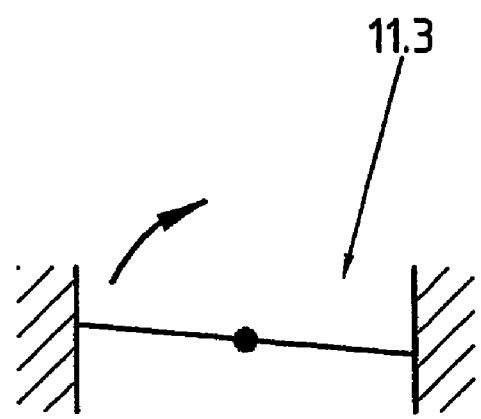
FIG. 5 is a schematic representation of a side view of a throttle valve for realizing the variably adjustable passage opening.
Figure 5:
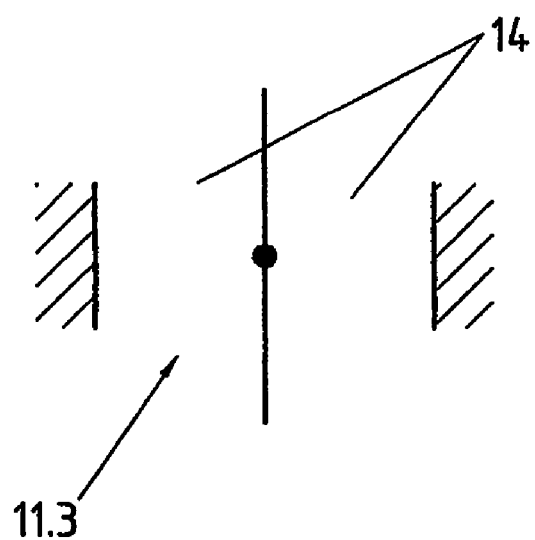

FIGS. 3 to 5 exemplify additional design elements for realizing another variably adjustable passage opening according to the invention. FIG. 3 shows a diagrammatic sketch of the functioning of a rotary disk valve 11.1; FIG. 4 shows that of a blind; and FIG. 5 shows that of a throttle valve, in each case with passage openings 14. Because these are only diagrammatic sketches, the other parts of the assembly bearing are not shown.

Figure 6:
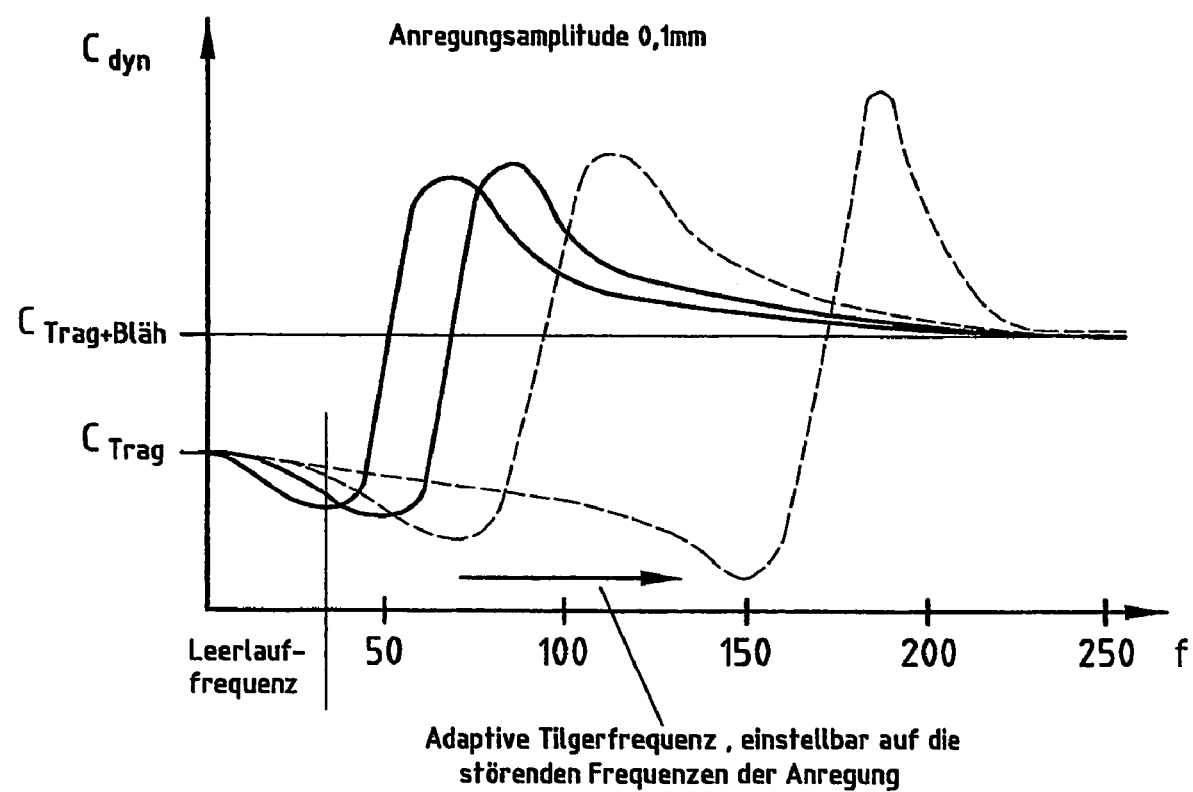
FIG. 6 shows the qualitative course of the bearing stiffness as a function of frequency for an assembly bearing of the invention with hydraulic damping.

FIG. 6 shows qualitatively the dynamic stiffness of an assembly bearing of the invention against the frequency for various opening cross-sections of the additional opening passage, realized, for example, via different positions of the lowering plate. With increasing opening cross-section, the damping curve is displaced toward higher frequencies. It can also be seen that because of the quenching effect, the dynamic stiffness is reduced below the bearing spring rate. This effect is more pronounced, the higher the frequency, because for large opening cross-sections the attenuation of the quenching resonance decreases. The reduction can be achieved over a broad frequency range that is significant for motor vehicle acoustics. The curves shown refer to low amplitudes despite the efficacy of the decoupling device. For this reason, the effect of the damping channel cannot be seen in FIG. 6.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly bearing with hydraulic damping for supporting engines and/or gear-boxes in motor vehicles, comprising:
   a working chamber and a compensation chamber, said working chamber and said compensation chamber having partially elastically deformable walls and being separated by a dividing wall;
   a damping channel through which a liquid is guided, said damping channel interconnecting said working chamber and said compensation chamber; and
   an additional passage opening formed by a peripherally extending conical surface disposed in said working chamber and by a lowering plate of adjustable height, said lowering plate being disposed in said working chamber in correspondence with said conical surface and adjustable from outside of the assembly;
   wherein said dividing wall includes an upper membrane cage and a lower membrane cage sandwiching a membrane for isolating high-frequency, low-amplitude vibrations;
   said additional passage opening is disposed upstream of said membrane: and
   said lowering plate is formed of an axially movable shifting rod disposed essentially centrally in the assembly and guided through a corresponding central opening, through said membrane, through said compensation chamber, and extending entirely into said working chamber, said lower membrane cage fixedly mounted and axially movable with said shifting rod.

2. The assembly bearing according to claim 1, wherein during the operation of the assembly said passage opening is variably adjustable depending on at least one control input provided by the assembly.

3. The assembly bearing according to claim 2, further comprising a control system for adjusting the passage opening.

4. The assembly bearing according to claim 2, wherein a dominant shaft order is selected as the control input.

5. The assembly bearing according to claim 2, wherein a second shaft order is selected as the control input.

6. The assembly bearing according to claim 1, wherein an outer edge of said lowering plate is bent away from said membrane.

7. The assembly bearing according to claim 1, wherein said peripherally extending conical surface is provided on a ring disposed on said dividing wall.

8. The assembly bearing according to claim 1, further comprising a device for an axial displacement of said shifting rod.

9. The assembly bearing according to claim 8, wherein said device is an electric motor.

10. The assembly bearing according to claim 9, wherein said electric motor is operable by means of a control system.

11. The assembly bearing according to claim 1, wherein the said lowering plate is provided with an opening for reducing damping.

12. The assembly bearing according to claim 1, wherein the assembly is provided with an idling mode.

13. The assembly bearing according to claim 12, wherein in said idling mode said additional passage opening is closed and free play of said membrane is unrestricted by said lower membrane cage.

14. The assembly bearing according to claim 1, further comprising a disc spring secured to said shifting rod.

* * * * *